(12) United States Patent
Duckett, III

(10) Patent No.: US 12,204,088 B2
(45) Date of Patent: Jan. 21, 2025

(54) APOCHROMATIC ROD LENS RELAY SYSTEM WITH REDUCED SPHEROCHROMATISM AND AN ENDOSCOPE WITH IMPROVED RELAY SYSTEM

(71) Applicant: KARL STORZ Imaging, Inc., Goleta, CA (US)

(72) Inventor: George E. Duckett, III, Castaic, CA (US)

(73) Assignee: KARL STORZ Imaging, Inc., Goleta, CA (US)

( * ) Notice: Subject to any disclaimer, the term of this patent is extended or adjusted under 35 U.S.C. 154(b) by 266 days.

(21) Appl. No.: 17/681,488

(22) Filed: Feb. 25, 2022

(65) Prior Publication Data
US 2023/0273422 A1    Aug. 31, 2023

(51) Int. Cl.
G02B 23/24      (2006.01)
G02B 13/00      (2006.01)
G02B 27/00      (2006.01)

(52) U.S. Cl.
CPC ..... G02B 23/2446 (2013.01); G02B 13/0095 (2013.01); G02B 23/243 (2013.01); G02B 27/005 (2013.01)

(58) Field of Classification Search
CPC .............. G02B 23/2446; G02B 23/243; G02B 13/0095; G02B 27/005
USPC ........................................................ 359/642
See application file for complete search history.

(56) References Cited

U.S. PATENT DOCUMENTS

| 3,257,902 A |   | 6/1966  | Hopkins |
|-------------|---|---------|---------|
| 4,964,710 A |   | 10/1990 | Leiner  |
| 5,519,532 A |   | 5/1996  | Broome  |
| 5,684,629 A | * | 11/1997 | Leiner ................ G02B 13/0095 |
|             |   |         | 359/434 |

(Continued)

FOREIGN PATENT DOCUMENTS

| EP | 0646821 A2 | 4/1995 |
| RU | 2037859 C1 | 6/1995 |
| RU | 2120224 C1 | 10/1998 |

OTHER PUBLICATIONS

Julian, J., Extended European Search Report, Jul. 10, 2023, pp. 1-7, European Patent Office, Munich.

(Continued)

*Primary Examiner* — Wyatt A Stoffa
*Assistant Examiner* — Mitchell T Oestreich
(74) *Attorney, Agent, or Firm* — David N. Villalpando; Jacqueline Cohen

(57) ABSTRACT

An image relay system is presented that includes an opposing pair of rod lens assemblies positioned symmetrically with respect to a central airspace. The rod lens assemblies include a meniscus lens positioned immediately adjacent to a central airspace and with the convex surface facing the airspace, a first lens having positive optical power with a convex face positioned adjacent to the inner face of the meniscus lens, a rod lens adjacent to the first lens having positive power, and a second lens having positive optical power positioned adjacent to the rod lens, the relay system designed so that light across a broad spectrum come to a common focus, as well as correcting for spherical aberration across the broad spectrum. An endoscope employing this relay system is also presented.

17 Claims, 10 Drawing Sheets

PRIOR ART

(56) References Cited

U.S. PATENT DOCUMENTS

| | | |
|---|---|---|
| 5,892,625 A | 4/1999 | Heimer |
| 7,724,430 B2 | 5/2010 | Kasai |
| 9,817,227 B2 | 11/2017 | Schouwink et al. |
| 9,918,619 B2 | 3/2018 | Tesar |
| 2014/0343362 A1 | 11/2014 | Tesar |

OTHER PUBLICATIONS

Takhirov, I. I., Eurasian Search Report (incl. machine translation), Aug. 31, 2023, pp. 1-7, Eurasian Patent Office, Moscow.

\* cited by examiner

APOCHROMATIC ROD LENS RELAY SYSTEM WITH REDUCED SPHEROCHROMATISM AND AN ENDOSCOPE WITH IMPROVED RELAY SYSTEM

TECHNICAL FIELD OF THE INVENTION

The invention relates generally to the field of medical image capture and more specifically to endoscope designs for improving performance in fluorescent imaging and visible light imaging.

BACKGROUND OF THE INVENTION

Endoscopes, and in particular rigid endoscopes, often make use of an image relay system whereby image light from an object is collected at a distally placed objective lens, and then relayed, by the relay system, through an elongated shaft to the proximal side of the shaft where an eye piece or image sensing system is positioned. Since the time of the innovations H. Hopkins, endoscopic relay systems have often included a series of relay lenses (usually in pairs). These relay lenses systems have conventionally been comprised mainly of rod lens elements, see for example U.S. Pat. No. 3,257,902. Rod lens relay systems have many advantages over systems used prior to Hopkins, but also introduce their own issues, among which are optical aberrations which can be introduced and multiplied for every rod lens used in the system. In particular spherochromatism can be prevalent in endoscopic systems, particularly when smaller f-numbers are used to permit the transmission of more light from the distal to the proximal end of the endoscopic shaft, which is usually desirable. Spherochromatism results in longitudinal chromatic aberration varying for different wavelengths in different zones of the lens surface. This spherochromatism yields images that are out of focus for certain wavelengths at a given focal plane even if the primary chromatic aberrations are well corrected.

Certain endoscopic procedures use fluorescing agents or autofluorescence to permit enhanced visualization of tissue. A fluorescing agent such as a dye may be injected or otherwise administered to the tissue. Subsequently, excitation light is directed toward the tissue. Responsive to the excitation light, the fluorescing agent fluoresces (emits light, typically at a longer wavelength than the excitation light), allowing a sensor to detect this emission light. Image data is collected by the sensor, and examining the collected images can indicate the presence and concentration of the fluorescing agent in the observed tissue. In addition, a phenomenon known as autofluorescence, in which tissue fluoresces under certain conditions without a fluorescing agent, may occur. Such autofluorescence can be detected as well. Imaging based on detected fluoresced light, known as "fluorescence imaging" (FI), is useful in medical diagnosis and testing, as well as in many other scientific fields, and it may be combined with visible light imaging for many purposes including to enhance surgical visualization and precision.

A typical prior art endoscope 2, as illustrated in FIG. 1, usually includes a first imaging lens (e.g., an objective) followed by a series of carrier lenses (e.g., relays) which capture and transmit an optical image from inside an enclosed area 1 to the outside. The proximal end of the endoscope 2 may be attached, via direct coupling or an adaptor, to a camera head 3 or an eye-piece for viewing. The camera head 3 usually includes lenses for receiving the optical image and forming a real optical image onto the image sensor. The digital image captured by the image sensor can then be transmitted to a camera control unit (CCU) or other similar module for analysis and display.

Frequently, endoscopes that are used for FI applications, for example for applications with the commonly used dye indocyanine green (ICG), are designed and deployed primarily for visible light imagery. As such, they are not typically designed to maintain a constant focus between infrared light and visible light. Spherochromatism is particularly troublesome in systems intended to be used over a very wide wavelength range. The use of endoscopes for FI and visual imaging often extends the used wavelength range from 400-750 nm (visible light from violet to red) to 400-950 nm (the visible spectrum plus the NIR spectrum) or broader. To perform FI imaging, such scopes often employ an appropriate optical filter to block the excitation light and transmit the fluoresced light. However, as mentioned previously, as these endoscopes are generally optimized for conventional visible light observation. Therefore, due to the properties of the optical elements of the scope, including the relay lens system, the infrared fluorescence is focused at a different plane than the visible light. This is primarily due to chromatic aberration occurring throughout the optical system, and in particular within in the image relay system, which is further exacerbated due to spherochromatism, particularly when a fast relay system, that is a system with small f-numbers, is used. There are existing approaches to compensate for the resulting focal differences. Camera head solutions include those wherein multiple sensors are employed, with sensors, associated with particular wavelength bands (for example one for visible light and one for infrared light) located at different focal planes. Incoming image light is directed to the appropriate sensor by dichroic beam splitter. The various spectral bands are detected on the multiple sensors, each an individually appropriately positioned focal plane, resulting in two, independently captured, in-focus images. This approach is disadvantageous due, only in part, to the complexity and cost of the necessity for multiple image sensors. Another major concern is that each individual endoscope used with such a camera head includes optics which may be particular to that make, model and manufacture of scope. Each particular endoscope will have varying amounts of chromatic error, requiring any camera head used therewith to compensate specifically for the error associated with the coupled scope. It is very difficult to construct a single camera head capable of compensating for a variety of endoscope models. Another camera head solution is disclosed in U.S. Pat. No. 10,806,332 B2, "Fluorescence Imaging Scope with Reduced Chromatic Aberration," to the inventor of the present application, issued Oct. 10, 2020, and hereby incorporated by reference. In this citation, the inventor proposes a series of optical elements, including beam splitting prisms, in order to split the various wavelength bands that focus to a particular focal plane, such that the differing bands travel separately, and the separated beams are then made to traverse independent effective optical distances, at which point they are recombined and focused onto a single image sensor, with all FI and visible spectra being captured in focus.

Other efforts to compensate for focal differences, such as, for example, that found in U.S. Pat. No. 8,773,756 to Tesar, et al., involve using an optical coupler that splits the light into two paths, a visible spectrum path and a NIR spectrum path. Different optical elements are used in each of the two beam paths to compensate for the chromatic focal differences. However, as with camera head solutions, such systems fail to compensate for differences between various endoscopes or to compensate for the variety of chromatic aberrations across the entire desired spectrum. For example, there is chromatic aberration, in the same direction as IR light, in the deep blue range of the visible spectrum, not addressed by Tesar, resulting in the deep blue range of the visible image being not being ideally focused at the same plane as the remainder of the visible light. The dispersive properties of the optical materials used in endoscopes, and long glass paths through such optical materials, make conventional correction of the entire spectrum from violet or deep blue to infrared particularly difficult. Finally, chromatic aberration includes both longitudinal chromatic aberration and lateral chromatic aberration due to obliquely incident light from the object space. Techniques that employ lenses or prisms to correct for longitudinal chromatic aberration often introduce unwanted lateral chromatic aberration. Another relay lens based correction system is presented in U.S. patent application Ser. No. 17/129,391, "Rod Lens Relay system with Reduced Chromatic Aberration," by the present inventor, filed Dec. 21, 2020, and herein incorporated by reference. This previous invention by the inventor presents several advantageous rod lens designs for reducing chromatic aberration in the relay system, and simplifying the optical system over previously known systems such as that by Tesar.

As endoscope side solutions, such as specifically designed relay and/or objective systems, offer certain advantages over camera head solutions, such as allowing these corrective endoscopes to be used with a plurality of compatible camera heads, what is needed are devices and methods to enable endoscope-side solutions to issues associated with chromatic aberrations, in particular spherochromatism, over the entire spectrum of interest from violet to red for scopes intended to image visible light and from violet to infrared wavelengths of interest for FI-vis scopes, thereby allowing the reliable capture of in-focus broad spectrum images. It should further be noted that when relay systems are exceptionally fast (as is usually desired, when possible) and/or a larger number of relays are required to transmit optical information from the distal end of a scope to the proximal end, spherochromatism of the individual relays accumulate over the overall relay system, resulting in the further degradation of the image, and/or requiring an even more complex objective to attempt to compensate for the aggregated aberration. Therefore, in particular, what is needed are endoscope-side solutions, in particular systems wherein the necessary spherochromatic corrections are made within the relay lens elements themselves, reducing, thereby, spherochromatism present in overall systems of the prior art across a wide visible range (for example, from 400-700 nm) and/or throughout the entire spectrum likely to be used with both visible and fluorescent imaging (for example from 400-900 nm). What is further needed are endoscopes for broad band imaging applications without expensive and slow optical elements such as autofocus mechanisms or adapters and processing systems for chromatic aberration correction.

SUMMARY OF THE INVENTION

An object of the present invention is to improve imaging for endoscopic devices over the entire visible spectrum from violet to red and/or the entire visible spectrum as well as the near infrared (NIR). In order to achieve this objective, various aspects of the invention provide advancements in devices and optical systems, in particular relay lenses, that enhance endoscope imaging in both FI and visible light capabilities. Apochromatic relay lenses and associated systems are disclosed that correct spherochromatism throughout the visible spectrum and/or from the violet (around 400 nm) through the infrared (around 900 nm) spectrum which is a range commonly utilized in visible and fluorescent imaging for endoscopic procedures. In particular, specific relay lens and system designs are disclosed which utilize fewer optical elements than have heretofore been possible to provide significant reduction in spherochromatism than any previously known systems. Further, some embodiments enable the use of more economical parts than possible with other state-of-the-art systems, decreasing cost while simultaneously simplifying manufacture of both the relay lens systems themselves as well as the endoscopic devices in which they may be used.

According to a first aspect of the invention, a relay system for an endoscope is provided. The relay system includes an opposing pair of rod lens assemblies positioned symmetrically with respect to a central airspace, wherein each rod lens assembly includes optical elements consisting essentially of a meniscus lens, a first lens, a rod lens, and a second lens. The meniscus lens is positioned immediately adjacent to a central airspace and with the convex surface facing the airspace. The first lens has positive power with a convex face positioned adjacent to the inner face of the meniscus lens and in some embodiments is formed of a material having anomalous partial dispersion. The rod lens is adjacent to the first lens having positive power, and has a first face and a second face, both first and second faces being beam passing faces, and the second face is planar. The second lens is plano-convex and also has a positive optical power with two faces, the planar face adjacent to the second, planar face of the rod lens. This relay lens assembly consisting of the meniscus lens, the first lens having positive power, the rod lens, and the second lens having positive power together provide chromatic aberration correction by manipulating light across a continuous spectrum from a violet region of the spectrum through at least a red region of the spectrum to come to a common focus in a common image plane, and wherein spherical aberration is well corrected across the spectrum.

According to some implementations of the invention, the spectrum across which correction of chromatic aberration and spherical aberration occurs is predominantly in the visible through NIR spectra. In some embodiments the spectrum is from 400-900 nm. In other embodiments the spectrum is predominantly in the visible range, i.e., from about 400-700 nm.

One aspect of some implementations is that the rod lens may have two planar surfaces, in which case, the first lens having a positive power is a plano-convex lens, with its planar face adjacent to the first, planar face of the rod lens.

In some embodiments, the first lens having positive power is a convex-convex lens.

One aspect of some implementations of the invention is that the first lens with a positive power is composed of a material having anomalous partial dispersion. In some implementations this first lens with positive power is comprised of fluorine glass, phosphate glass, or fluorophosphate glass; and has an index of refraction between 1.43 and 1.55 at a wavelength of 587 nm.

In some embodiments of the invention, all four of the optical elements, that is the meniscus lens, the first lens with positive optical power, the rod lens, and the second lens with positive optical power are cemented together to form a single unit.

One of the aspects of some of the embodiments is that the second lens with a positive optical power has a higher refractive index and lower Abbe number than those values of the rod lens.

In some embodiments, each rod lens assembly has a working f-number of less than six. The relay system itself, in some embodiments, may contain an aperture stop in the central airspace between the rod lens assemblies.

According to a second aspect of the invention, an endoscope is provided including a shaft with a distal and proximal end. An objective lens or lens system collects light from a subject scene and passes it to an image relay system. The relay system includes at least one pair of rod lens assemblies according to one or more of the embodiments disclosed above. The relay system relays the image light to a proximal lens group which focuses the image, comprising light of wavelengths over a broad spectrum across the visible range, and, in some embodiments into the NIR range, onto a single image plane.

Particular embodiments include at least 5 relay lens pairs, at least one of which is a corrective pair such as described previously.

Another aspect of some embodiments of the invention is an electronic image sensor placed in the image plane of the endoscope in order to capture images of the subject scene relayed by the relay system.

These and other features of the invention will be apparent from the following description of the preferred embodiments, considered along with the accompanying drawings.

BRIEF DESCRIPTION OF THE DRAWINGS

The present invention will become more fully understood from the detailed description given herein and the accompanying drawings which are given by way of illustration only, and thus are not limitative of the present invention, and wherein.

DETAILED DESCRIPTION OF EXAMPLE EMBODIMENTS

As used herein, first elements (e.g., sensors and lenses) that are "optically arranged" in relation to other elements, refers to the first elements' position along a common optical path that includes first and other elements. For example, a lens group optically arranged between an image sensor and an objective, means that the lens group occupies a portion of the optical path that light travels (e.g., from the objective to the image sensor) for capturing images or video.

Because digital cameras and FI sensors and related circuitry for signal capture and processing are well-known, the present description will be directed in particular to elements forming part of, or cooperating more directly with, a method and apparatus in accordance with the invention. Elements not specifically shown or described herein are selected from those known in the art. Certain aspects of the embodiments to be described are provided in software. Given the system as shown and described according to the invention in the following materials, software not specifically shown, described or suggested herein that is useful for implementation of the invention is conventional and within the ordinary skill in such arts.

Figure 1:
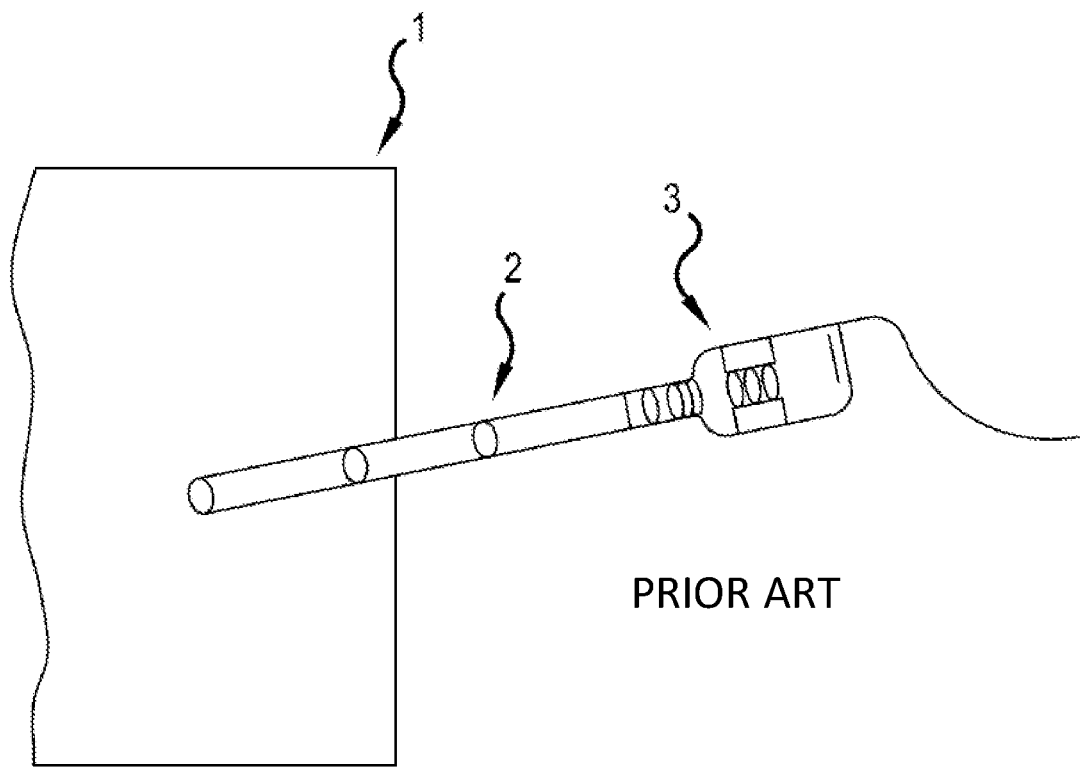
FIG. 1 is diagram of a prior art endoscopic system.
Figure 2:
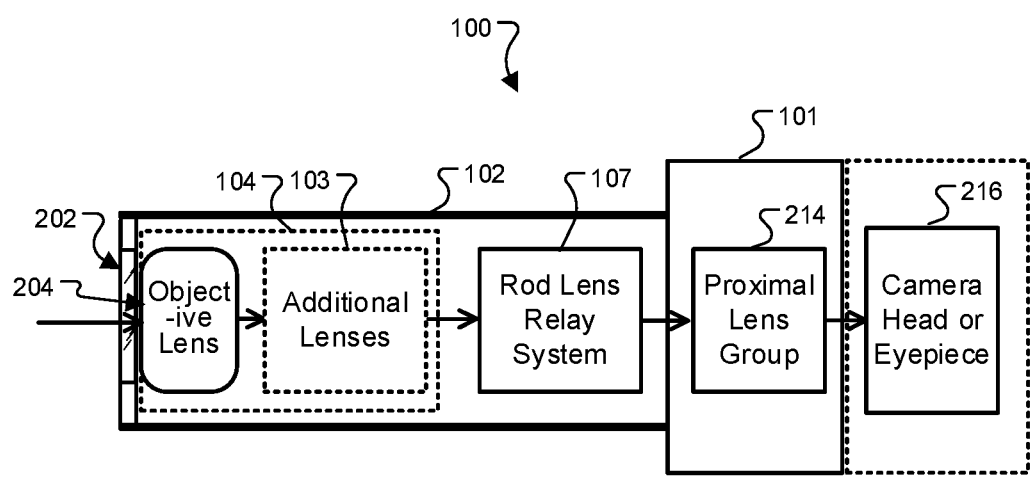
FIG. 2 is a block diagram of an endoscope device including a scope and an attached camera head.

FIG. 2 is a block diagram of an endoscope device 100 according to an example embodiment of the invention. Endoscope device 100 ("device 100", "endoscope 100") includes a shaft 102 connected to a proximal element 101. The proximal element 101 may be an eyecup including an eyepiece enabling the user to view visible light traversing the shaft 102. The eyecup may also act as an attachment element to connect the scope to a camera head 216 containing one more image sensors, via a bayonet connection, or other connection system known in the art. Alternatively the camera head element may be integrated with the shaft via the proximal element 101. Various structural components supporting the depicted elements are omitted in the diagrams herein, as well as other components such as illumination sources, fluorescent excitation sources, and controls which are known in the art and are not shown in order to avoid obscuring the relevant details of the example embodiments of the invention. At the left is shown the distal tip of the endoscope shaft 102 including a cover glass 202, which in this version faces directly along the longitudinal axis of the shaft 102, but may also be positioned at an angle relative to the longitudinal axis as is known in the art. Behind, or on the proximal side of, the cover glass 202 is shown a preferred position for the objective lens 204, usually set against or very near cover glass 202 and preferably assembled together with the cover glass in construction. While a wide angle lens is preferred for objective lens 204, this is not limiting, and any suitable lens may be used in various embodiments. Objective lens 204 may be part of an objective lens group 104 which may include one or more additional lenses 103. The particular number and arrangement of lenses in the endoscope shaft 102 will vary widely depending on the application. Optically arranged or attached at the proximal side of objective lens 204 or objective lens group 104 is rod lens relay system 107, which serves to pass the light down shaft 102 in the proximal direction. Rod lens relay system 107, including rod lens pairs, is adapted to direct the image light to create a telecentric internal image space at the proximal end of the one or more rod lenses, where a proximal lens group 214 is positioned as further discussed below. Also, the shaft 102 is typically rigid but shaft design variations are also known to allow rod lenses to be used in a semi-flexible shaft in which flexible joints are present in one or more places along the shaft between the rod lenses, while the shaft is rigid along the portions containing a rod lens. Such a shaft design may be used in various embodiments of the invention.

Rod lens relay system 107 is corrected for the spherical and chromatic aberration, and in particular spherochromatism, of the endoscope's multiple lenses such that a first portion of light having a first wavelength spectrum and a second portion of light having a second wavelength spectrum different from the first are focused onto substantially the same image plane. Assembly 214 is positioned within a telecentric internal image space proximal to rod lens relay system 107. Proximal lens group 214 is preferably positioned within the proximal element 101 of device 100 but may partially span the volume of the shaft 102 and the proximal element 101 or may be an element of the camera head or eyepiece 216.

Typically, a rod lens relay system 107 is integrated with endoscope device 100, and, in particular, the shaft 102, and is designed to correct for optical aberrations including spherochromatism. The eyepiece, or the image sensor assembly and its associated electronics (together constituting a camera) may be integrated with the device or may be separate and detachable, such as a detachable eyepiece or a detachable camera head. In various embodiments the invention may therefore constitute an endoscopic device or an imaging system including an endoscopic device 100.

Figure 3:
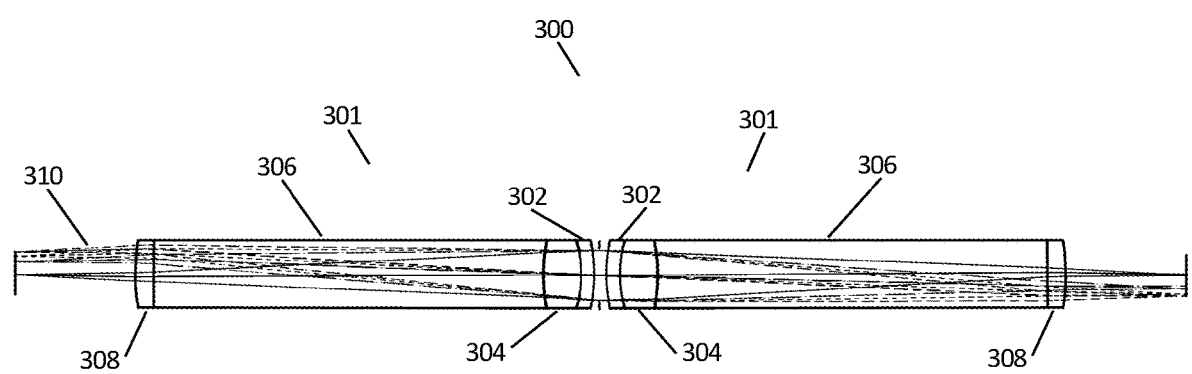
FIG. 3 is a partial cross section diagram of an optical relay system according to some embodiments of the invention.

FIG. 3 is a representative partial cross section diagram of an optical relay lens system 300 according to some embodiments to be used in an endoscope device 100. It should be noted that the figure shows the general shapes of the described optical elements and should not be understood to represent actual to-scale measured values of the individual or overall elements. As is presented in the Tables below, each disclosed embodiment varies somewhat in the particular shape and size of each element. The depicted relay system 300 may be employed, for example, as rod lens relay system 107 in the system of FIG. 2. Relay system 300 includes an opposing pair of rod lens assemblies 301 positioned symmetrically with respect to a central airspace. More than one such pair may be employed in series to provide an overall relay system with a greater length, and the present invention is particularly beneficial in systems wherein multiple pairs of rod lens assemblies are used. The central airspace between rod lens assemblies 301 may contain an aperture stop. Various embodiments of the present invention have the advantage of consisting of only four optical elements per rod lens assembly 301 and each rod lens assembly may be fully cemented together, which can simplify the design and assembly of the overall relay system within the shaft 102.

Each rod lens assembly 301, according to the embodiment shown in FIG. 3, includes a meniscus lens 302 positioned adjacent to the opposing rod lens assembly. A convex-convex lens 304 with a positive optical power has a first convex face positioned adjacent to an inner face of meniscus lens 302 and a second convex face at the opposite side. Other embodiments may include different lenses used instead of a convex-convex lens 304. A rod lens 306 has a first concave surface positioned adjacent to the second convex face of the convex-convex lens 304. The opposing, outer surface of rod lens 306 is a planar surface, and is positioned adjacent thereto is a plano-convex lens 308 with a positive optical power and having a convex face facing away from the planar face of rod lens 306.

A representative light ray diagram is shown showing the path taken by light 310 passing from an object plane depicted on the left to an image plane depicted on the right. It should be noted that this the light rays 310 are shown only for illustrative purposes and should not be taken to indicate the exact paths light rays will travel through the system. Meniscus lens 302, convex-convex lens 304, rod lens 306, and plano-convex lens 308 together perform optical aberration correction by manipulating light 310 across a desired broad spectrum, for example, from the blue region through the near IR region to be substantially free of spherochromatism and have substantially the same effective optical path length and thus coming to a common focus at a common image plane. This allows for simultaneous imaging throughout the spectrum with an image substantially free of aberrations due to spherochromatism. Each rod lens assembly 301 has no additional optical manipulating elements other than the those listed which together provide a chromatic and spherochromatism correction sufficient to allow simultaneous imaging across the desired spectrum at the depicted common imaging plane, or sequential or separate imaging (for example visible and NIR imaging) without refocusing adjustments for the visible and IR spectra. Sequential imaging is sometimes used in various FI techniques, for example in methods wherein the image scene is first illuminated with white light and then subsequently with an excitation wavelength of the targeted fluorophore. The amount of spherochromatism and chromatic aberration corrected may vary depending on the materials, sizes, and curvatures of the various optical manipulating elements. Depending on the f-number of the system, the amount of spherochromatism and correction in focal position due to chromatic aberration sufficient to allow simultaneous imaging across the desired spectrum may be less than about 15 micrometers shift across the spectral range of 400 nm to 900 nm. It is a particular benefit of the present invention, that smaller f-numbers may be used in the optical system, permitting thereby more light to be collected and relayed from the illuminated scene than has heretofore been possible without introducing significant aberration due to spherochromatism. over the desired broad wavelength bands. Preferred embodiments of the invention will have a working f-number for the relay system of 6 or less. Additionally, depending on the number of relays in a system, this correction in focal position as well as spherochromatism may vary, as associated errors accumulate over multiple relays. More preferably, a correction to a total aberration of 10 micrometers of focal shift across that range is achievable with certain embodiments employing the relay system of FIG. 3.

Meniscus lens 302 is preferably constructed with a crown glass having a refractive index greater than 1.70 and an Abbe number between 32 and 45. Preferably, the first positive power lens 304, which is typically a bi-convex lens but may be another positive power lens, is constructed of a material having anomalous partial dispersion. For example, various types of crown glass may be used for this lens, preferred materials being selected from phosphate glass, fluorite glass fluorophosphate glass. A relatively high Abbe number is preferably used. For example, example embodiments disclosed herein employ crown glass with an Abbe number of approximately 77 and 91. For example, first positive power lens 304 has an Abbe number of 76.98 in some embodiments. The rod lens 306 is, in some embodiments, such as that shown in FIG. 3, a plano-concave lens. Having one or more planar surfaces can be advantageous in simplifying the production (and minimizing associated expense) of the rod lens element. The plano-convex lens 308 is of positive optical power and is preferably selected such that its refractive index is greater than that of the rod lens 306. Optical properties of the surface elements of one possible implementation of the embodiment shown in FIG. 3 are given in Table 1.

TABLE 1

Surface Data Summary for one implementation of the embodiment FIG. 3

| Surface | Radius | Thickness | Index | Abbe no. | Clear Diam |
|---|---|---|---|---|---|
| Obj | Infinity | 9.705 | Air | | 3.27 |
| 1 | 17.7736 | 1.500 | 1.762 | 26.52 | 5.4 |
| 2 | Infinity | 31.450 | 1.618 | 49.83 | 5.4 |
| 3 | 16.2181 | 3.001 | 1.497 | 81.55 | 5.4 |
| 4 | −7.8661 | 1.125 | 1.757 | 47.82 | 5.4 |
| 5 | −12.0670 | 0.450 | Air | | 5.4 |
| STO | Infinity | 0.450 | Air | | 4.37 |
| 7 | 12.0670 | 1.125 | 1.757 | 47.82 | 5.4 |
| 8 | 7.8661 | 3.001 | 1.497 | 81.55 | 5.4 |
| 9 | −16.2181 | 31.450 | 1.618 | 49.83 | 5.4 |
| 10 | Infinity | 1.500 | 1.762 | 26.52 | 5.4 |
| 11 | −17.7736 | 9.705 | Air | | 5.4 |
| IMA | Infinity | | | | 3.27 |

Figure 4:
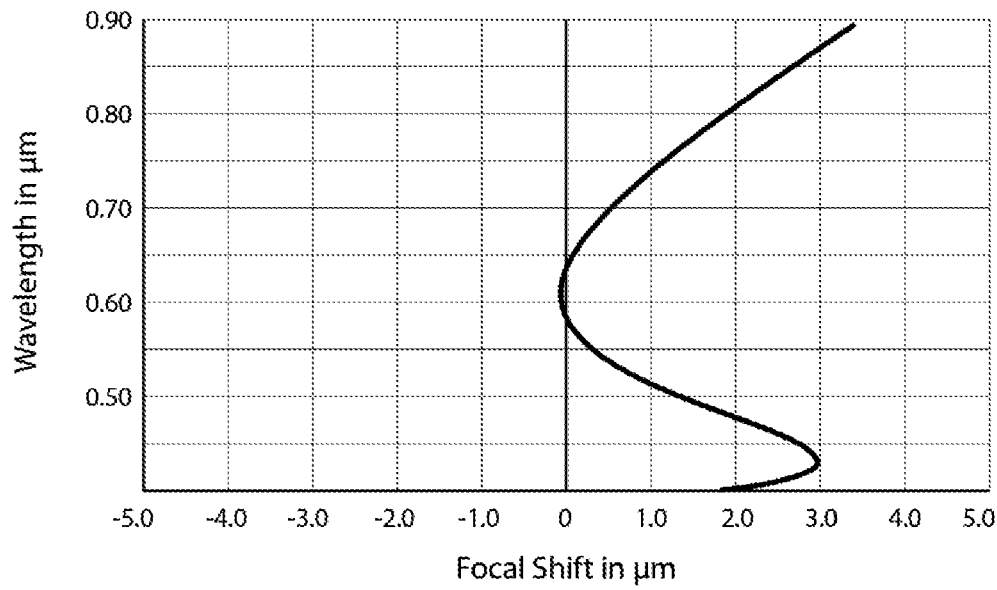
FIG. 4 is a chart showing the wavelength versus focal shift achievable with the optical relay system of FIG. 3 according to the values of Table 1 in one example embodiment.

FIG. 4 is a chart showing focal shift values, and thereby the chromatic aberration correction achievable for given wavelengths with the relay system of FIG. 3 according to an example implementation with the properties shown in Table 1. The vertical axis shows the light wavelength in micrometers from 0.4 to 0.9 (400 to 900 nanometers), and the horizontal axis shows the focal shift provided by the relay system using a single pair of rod lens assemblies 301 in an overall endoscope optical assembly. As can be seen on the chart, the focal shift varies across the spectrum and is about 2 micrometers at the 405 nanometer wavelength and exhibits a curve to about 3.5 micrometers of focal shift at the 900 nanometer wavelength, with a focal shift of zero at 587.6 nm, for a total focal shift of about 1.5 micrometers from one end of the depicted spectrum to the other. This focal shift provided by the inventive optical relay system minimizes the variance of focal position as a function of wavelength which would ordinarily be present due to chromatic aberration of a conventional rod lens relay pair.

Other embodiments of the relay design shown in FIG. 3 are possible, depending on the needs of the system. Optical properties of the surface elements of another implementation of the embodiment shown in FIG. 3 are given in Table 2.

TABLE 2

Surface Data Summary for another implementation of the embodiment shown in FIG. 3

| Surface | Radius | Thickness | Index | Abbe no. | Clear Diam |
|---|---|---|---|---|---|
| Obj | Infinity | 9.497 | Air | | 3.27 |
| 1 | 19.7759 | 1.500 | 1.847 | 23.78 | 5.40 |
| 2 | Infinity | 31.651 | 1.618 | 49.83 | 5.40 |
| 3 | 14.5975 | 3.000 | 1.529 | 76.98 | 5.40 |
| 4 | −8.6055 | 1.132 | 1.835 | 43.13 | 5.40 |
| 5 | −12.9535 | 0.450 | Air | | 5.40 |
| STO | Infinity | 0.450 | Air | | 4.37 |

TABLE 2-continued

Surface Data Summary for another implementation of the embodiment shown in FIG. 3

| Surface | Radius | Thickness | Index | Abbe no. | Clear Diam |
|---|---|---|---|---|---|
| 7 | 12.9535 | 1.132 | 1.835 | 43.13 | 5.40 |
| 8 | 8.6055 | 3.000 | 1.529 | 76.98 | 5.40 |
| 9 | −14.5975 | 31.651 | 1.618 | 49.83 | 5.40 |
| 10 | Infinity | 1.500 | 1.847 | 23.78 | 5.40 |
| 11 | −19.7759 | 9.497 | Air | | 5.40 |
| IMA | Infinity | | | | 3.27 |

Figure 5:
FIG. 5 is a chart showing the wavelength versus focal shift achievable with a variant of the optical relay system of FIG. 3 according to the values of Table 2 in another example embodiment.

FIG. 5 is a chart showing chromatic aberration correction achievable with the relay system of FIG. 3 according to an example implementation with the properties shown in Table 2. As can be seen on the chart, the focal shift varies across the spectrum and is about-1.3 micrometers at the 405 nanometer wavelength and exhibits a curve to about 2.2 micrometers of focal shift at the 900 nanometer wavelength, with a focal shift of approximately-0.3 micrometers in the 650 nanometer range and zero at 587.6 nm, for a total focal shift of about 3.5 micrometers from one end of the depicted spectrum to the other. This focal shift provided by the inventive optical relay system minimizes the variance of focal position as a function of wavelength which would ordinarily be present due to chromatic aberration of a conventional rod lens relay pair.

Another embodiment of the relay design shown in FIG. 3 is presented with the optical properties of its surface given in Table 3.

TABLE 3

Surface Data Summary for one implementation of the embodiment shown in FIG. 3

| Surface | Radius | Thickness | Index | Abbe no. | Clear Diam |
|---|---|---|---|---|---|
| Obj | Infinity | 9.398 | Air | | 3.27 |
| 1 | 22.5067 | 1.500 | 1.963 | 24.11 | 5.4 |
| 2 | Infinity | 31.757 | 1.618 | 49.83 | 5.4 |
| 3 | 16.5703 | 3.000 | 1.529 | 76.98 | 5.4 |
| 4 | −8.5082 | 1.125 | 1.835 | 42.71 | 5.4 |
| 5 | −12.9618 | 0.450 | Air | | 5.4 |
| STO | Infinity | 0.450 | Air | | 4.37 |
| 7 | 12.9618 | 1.125 | 1.835 | 42.71 | 5.4 |
| 8 | 8.5082 | 3.000 | 1.529 | 76.98 | 5.4 |
| 9 | −16.5703 | 31.757 | 1.618 | 49.83 | 5.4 |
| 10 | Infinity | 1.500 | 1.963 | 24.11 | 5.4 |
| 11 | −22.5067 | 9.398 | Air | | 5.4 |
| IMA | Infinity | | | | 3.27 |

Figure 6:
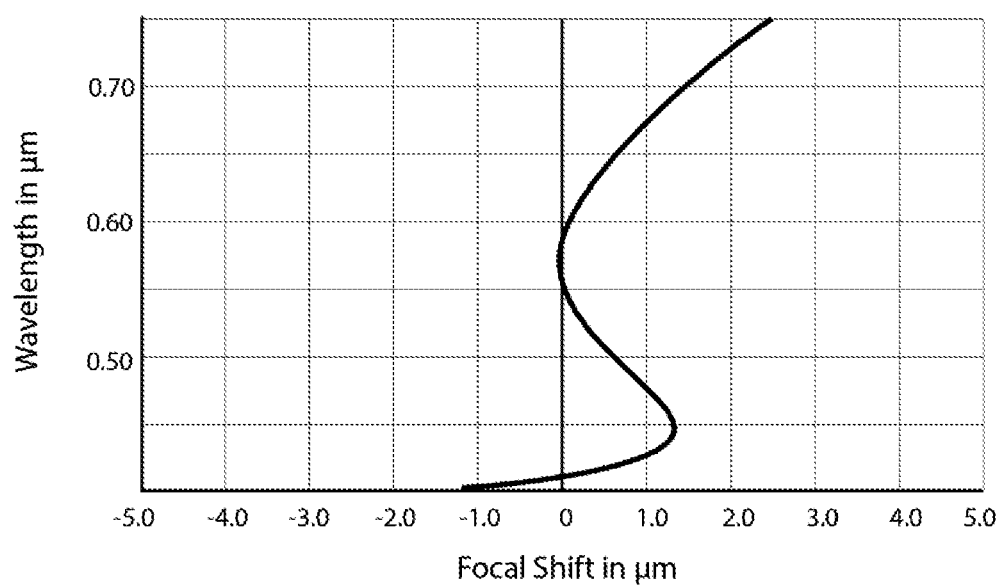
FIG. 6 is a chart showing the wavelength versus focal shift achievable with a variant of the optical relay system of FIG. 3 according to the values of Table 3 in another example embodiment.

FIG. 6 is a chart showing chromatic aberration correction achievable with the relay system of FIG. 3 according to an example implementation with the properties shown in Table 3. As can be seen on the chart, the focal shift varies across the spectrum and is about-1.3 micrometers at the 405 nanometer wavelength and exhibits a curve to about 2.5 micrometers of focal shift at the 750 nanometer wavelength, with a focal shift of zero at 587.6 nm, for a total focal shift of about 3.8 micrometers from one end of the depicted spectrum to the other, this depicted spectrum covering primarily the visible spectrum from 400 nm to 750 nm. This focal shift provided by the inventive optical relay system minimizes the variance of focal position as a function of wavelength which would ordinarily be present due to chromatic aberration of a conventional rod lens relay pair.

Figure 7:
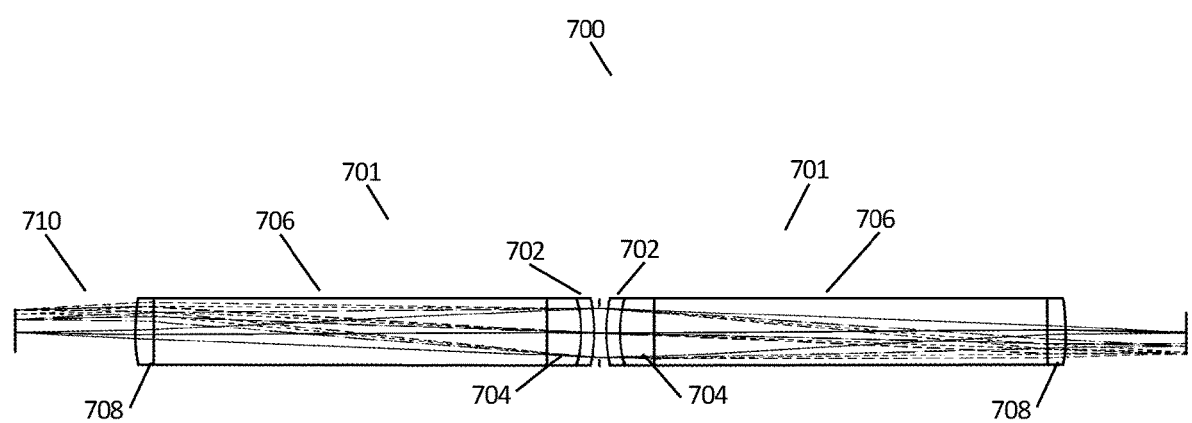
FIG. 7 is a partial cross section diagram of an optical relay system according to other embodiments of the invention where both faces of the rod lens are planar.

FIG. 7 is a representative partial cross section diagram of an optical relay lens system 700 according to additional embodiments to be used in an endoscope device 100. It should be noted that the figure shows the general shapes of the described optical elements and should not be understood to represent actual to-scale measured values of the individual or overall elements. As is presented in the Tables below, each disclosed embodiment varies somewhat in the particular shape and size of each element. The primary structural difference between this optical design and that shown in FIG. 3 is that this design utilizes a rod element 706 that has two planar surfaces. This variation can simplify production and decrease costs associated with the manufacture of the rod element 706 and the manufacture of the relay system 700. Relay system 700 includes an opposing pair of rod lens assemblies 701 positioned symmetrically with respect to a central airspace. As with the embodiments discussed above, more than one such pair may be employed in series to provide an overall relay system with a greater length, and the present invention is particularly beneficial in systems wherein multiple pairs of rod lens assemblies are used. The central airspace between rod lens assemblies 701 may contain an aperture stop. and each rod lens assembly may be fully cemented together, which can simplify the design and assembly of the overall relay system within the shaft 102.

Each rod lens assembly 701, according to the embodiment shown in FIG. 7, includes a meniscus lens 702 positioned adjacent to the opposing rod lens assembly. A first plano-convex lens 704 with a positive power has a first convex face positioned adjacent to an inner face of meniscus lens 702 and a second planar face at the opposite side. Other embodiments may include different lenses used instead of a plano-convex lens 704. A rod element 706 has a first planar surface positioned adjacent to the second planar face of the plano-convex lens 704. The opposing, outer surface of rod lens 706 is a planar surface, and is positioned adjacent thereto is a plano-convex lens 708 with a positive optical power and having a convex face facing away from the planar face of rod lens 706.

A representative light ray diagram is shown showing the path taken by light 710 passing from an object plane depicted on the left to an image plane depicted on the right. It should be noted that this the light rays 310 are shown only for illustrative purposes and should not be taken to indicate the exact paths light rays will travel through the system. Meniscus lens 702, plano-convex lens 704, rod element 706, and the plano-convex lens 708 together perform optical aberration correction by manipulating light 710 across a desired broad spectrum, for example, from the blue region through the near IR region to be substantially free of spherochromatism and have substantially the same effective optical path length and thus coming to a common focus at a common image plane. This allows for simultaneous imaging throughout the spectrum with an image substantially free of aberrations due to spherochromatism. Each rod lens assembly 701 has no additional optical manipulating elements other than the those listed which together provide a chromatic and spherochromatism correction sufficient to allow simultaneous imaging across the desired spectrum at the depicted common imaging plane, or sequential or separate imaging (for example visible and NIR imaging) without refocusing adjustments for the visible and IR spectra. Sequential imaging is sometimes used in various FI techniques, for example in methods wherein the image scene is first illuminated with white light and then subsequently with an excitation wavelength of the targeted fluorophore. The amount of spherochromatism and chromatic aberration corrected may vary depending on the materials, sizes, and curvatures of the various optical manipulating elements. Depending on the f-number of the system, the amount of spherochromatism and correction in focal position due to chromatic aberration sufficient to allow simultaneous imaging across the desired spectrum may be less than about 15 micrometers shift across the spectral range of 400 nm to 900 nm. It is a particular benefit of the present invention, that smaller f-numbers may be used in the optical system, permitting thereby more light to be collected and relayed from the illuminated scene than has heretofore been possible without introducing significant aberration due to spherochromatism over the desired broad wavelength bands. Preferred embodiments of the invention will have a working f-number for the relay system of 6 or less. Additionally, depending on the number of relays in a system, this correction in focal position as well as spherochromatism may vary, as associated errors accumulate over multiple relays. More preferably, a correction to a total aberration of 10 micrometers of focal shift across that range is achievable with certain embodiments employing the relay system of FIG. 7.

Meniscus lens 702 is preferably constructed with a glass having a refractive index greater than 1.70 and an Abbe number between 32 and 35. Preferably, the first positive power lens 704, which is typically a plano-convex lens but may be another positive power lens, is constructed of a material having anomalous partial dispersion. For example, various types of crown glass may be used for this lens, preferred materials being selected from phosphate glass, fluorite glass, or fluorophosphate glass. A relatively high Abbe number is preferably used. For example, examples embodiments disclosed herein employ crown glass with an Abbe number of approximately 91. For example, first positive power lens 704 has an Abbe number of 90.90 in some embodiments. The rod lens 706 is, in some embodiments, such as that shown in FIG. 7, a plano-plano lens. Having two planar surfaces can be advantageous in simplifying the production (and minimizing associated expense) of the rod lens element. The plano-convex lens 708 is of positive optical power and is preferably selected such that its refractive index is greater than that of the rod element 706. Optical properties of the surface elements of one possible implementation of the embodiment shown in FIG. 7 are given in Table 4.

TABLE 4

Surface data summary for one implementation of the embodiment shown in FIG. 7

| Surface | Radius | Thickness | Index | Abbe no. | Clear Diam |
|---|---|---|---|---|---|
| Obj | Infinity | 10.469 | Air | | 3.27 |
| 1 | 21.0803 | 1.500 | 1.923 | 20.88 | 5.4 |
| 2 | Infinity | 30.302 | 1.620 | 36.26 | 5.4 |
| 3 | Infinity | 3.000 | 1.456 | 90.90 | 5.4 |
| 4 | −7.8025 | 1.509 | 1.738 | 32.33 | 5.4 |
| 5 | −12.8158 | 0.450 | Air | | 5.4 |
| STO | Infinity | 0.450 | Air | | 4.37 |
| 7 | 12.8158 | 1.509 | 1.738 | 32.33 | 5.4 |
| 8 | 7.8025 | 3.000 | 1.456 | 90.90 | 5.4 |
| 9 | Infinity | 30.302 | 1.620 | 36.26 | 5.4 |
| 10 | Infinity | 1.500 | 1.923 | 20.88 | 5.4 |
| 11 | −21.0803 | 10.469 | | | 5.4 |
| IMA | Infinity | | | | 3.27 |

Figure 8:
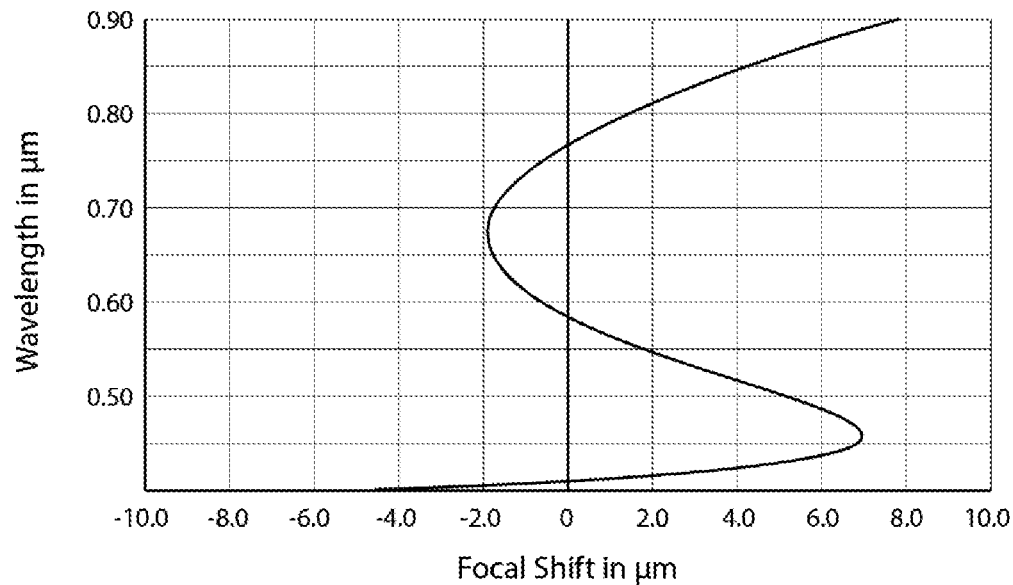
FIG. 8 is a chart showing the wavelength versus focal shift achievable with a variant of the optical relay system of FIG. 7 according to the values of Table 4 in another example embodiment.

FIG. 8 is a chart showing chromatic aberration correction achievable with the relay system of FIG. 7 according to an example implementation with the properties shown in Table 4. As can be seen on the chart, the focal shift varies across the spectrum and is about-4.5 micrometers at the 405 nanometer wavelength and exhibits a curve to about 7.8 micrometers of focal shift at the 900 nanometer wavelength, with a focal shift of approximately-2 micrometers in the 675 nanometer range, and zero at 587.6 nm, for a total focal shift of about 12.3 micrometers from one end of the depicted spectrum to the other, this depicted spectrum covering primarily the visible and NIR spectrums from 400 nm to 900 nm. This focal shift provided by the inventive optical relay system minimizes the variance of focal position as a function of wavelength which would ordinarily be present due to chromatic aberration of a conventional rod lens relay pair.

Another embodiment of the relay design shown in FIG. 7 is presented with the optical properties of its surface elements given in Table 5.

TABLE 5

Alternative surface data summary for one implementation of the embodiment shown in FIG. 7

| Surface | Radius | Thickness | Index | Abbe no. | Clear Diam |
|---|---|---|---|---|---|
| Obj | Infinity | 9.674 | Air | | 3.27 |
| 1 | 21.5394 | 1.500 | 1.923 | 20.88 | 5.4 |
| 2 | Infinity | 31.481 | 1.620 | 36.26 | 5.4 |
| 3 | Infinity | 3.000 | 1.456 | 90.90 | 5.4 |
| 4 | −7.9378 | 1.125 | 1.801 | 34.97 | 5.4 |
| 5 | −12.0681 | 0.450 | Air | | 5.4 |
| STO | Infinity | 0.450 | Air | | 4.37 |
| 7 | 12.0681 | 1.125 | 1.801 | 34.97 | 5.4 |
| 8 | 7.9378 | 3.000 | 1.456 | 90.90 | 5.4 |
| 9 | Infinity | 31.4812 | 1.620 | 36.26 | 5.4 |
| 10 | Infinity | 1.500 | 1.923 | 20.88 | 5.4 |
| 11 | −21.5394 | 9.674 | | | 5.4 |
| IMA | Infinity | | | | 3.27 |

Figure 9:
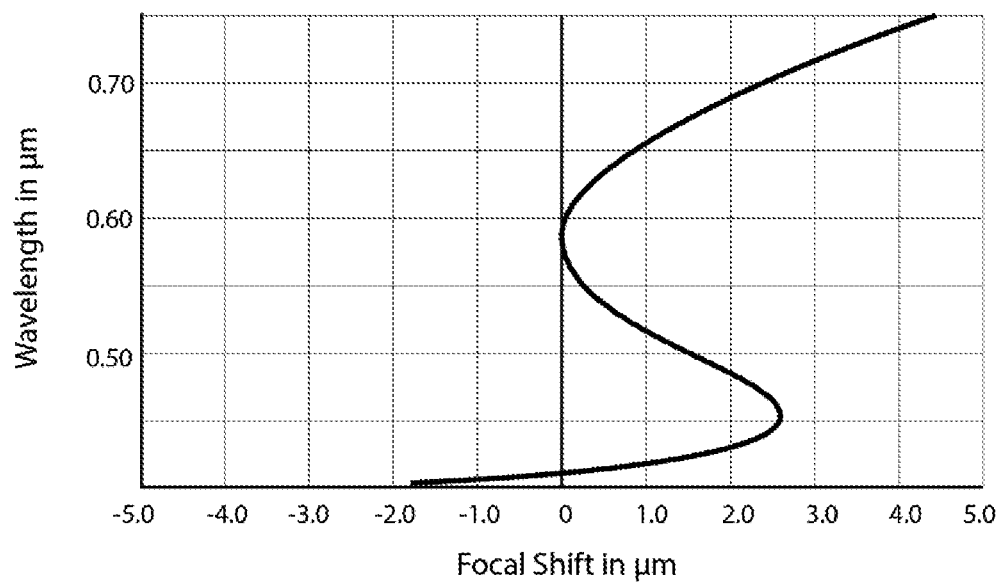
FIG. 9 is a chart showing the wavelength versus focal shift achievable with a variant of the optical relay system of FIG. 7 according to the values of Table 5 in another example embodiment.

FIG. 9 is a chart showing chromatic aberration correction achievable over primarily the visible spectrum with the relay system of FIG. 7 according to an example implementation with the properties shown in Table 5. As can be seen on the chart, the focal shift varies across the spectrum and is about −1.8 micrometers at the 405 nanometer wavelength and exhibits a curve to about 4.5 micrometers of focal shift at the 750 nanometer wavelength, with a focal shift of zero at 587.6 nm, for a total focal shift of about 6.3 micrometers from one end of the depicted spectrum to the other, this depicted spectrum covering primarily the visible spectrum from 400 nm to 700 nm. This focal shift provided by the inventive optical relay system minimizes the variance of focal position as a function of wavelength which would ordinarily be present due to chromatic aberration of a conventional rod lens relay pair.

Figure 10:
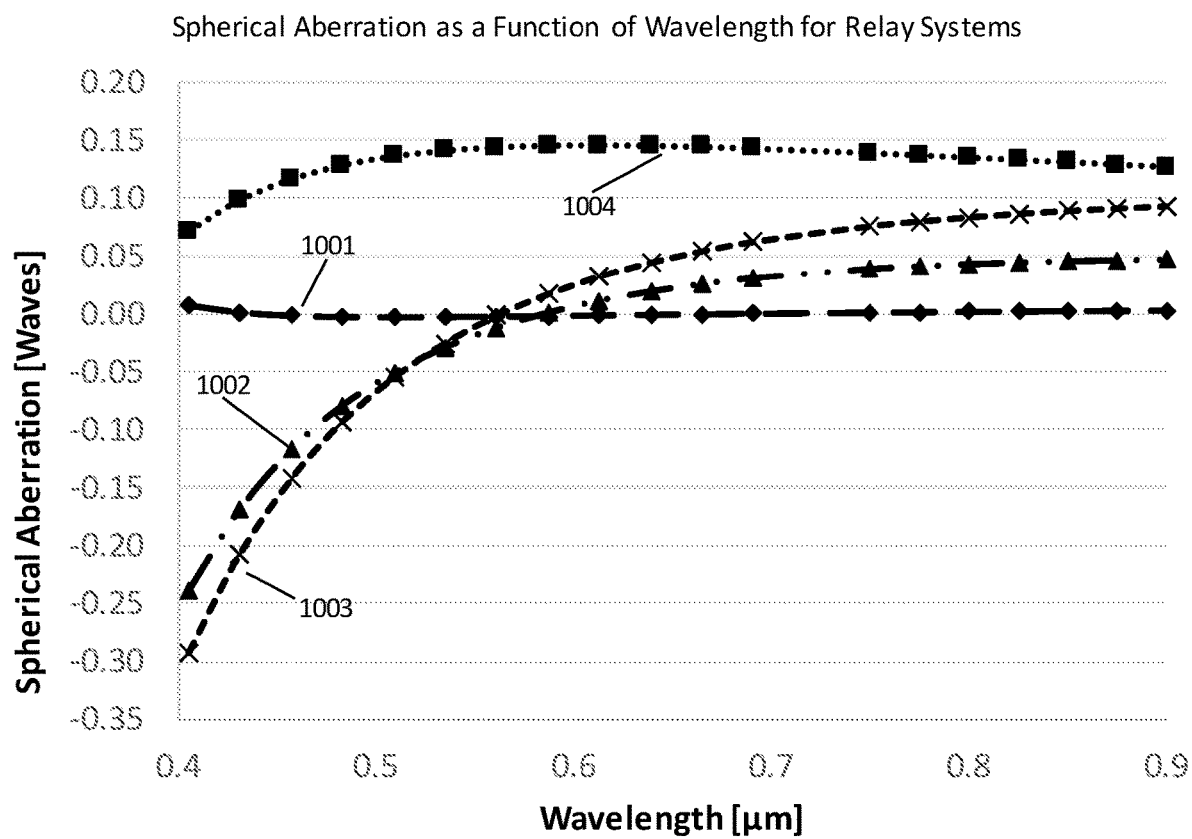
FIG. 10 shows data for various optical relay systems comparing spherical aberration over a range of wavelengths for the different systems.

Some of the benefits of the disclosed relay systems presented herein are illustrated by comparison to other systems in FIG. 10. A measure of Spherical Aberration (in waves) is presented vs. wavelength across the visible and NIR spectrum from 400-900 nm. Data 1001 represented by diamond shaped markers is presented for the present invention, showing a very low, relatively consistent value of spherical aberration across the entire spectrum. By contrast, data 1002 is shown for a conventional achromatic optical system known in the art by triangle shaped markers, showing a clear variation in the value of spherical aberration across the same wavelength range. Likewise, data 1003, represented by X shaped markers, shows spherical aberration for one of the embodiments disclosed in previously discussed U.S. patent application Ser. No. 17/129,391 to the present inventor, also exhibiting significant spherical aberration across the spectrum. Data shown by square shaped markers represents spherical aberration across the spectrum for one of the embodiments disclosed by Tesar in previously discussed U.S. Pat. No. 8,773,756, showing both significant variation as well as significant aberration across the entire range. It can thus be clearly seen that the present invention offers marked improvements in correcting for both chromatic aberration due to the wide wavelength range desired in imaging both in visible and NIR light as well as maintaining minimal variation and absolute spherical aberration across the same spectrum.

Figure 11:
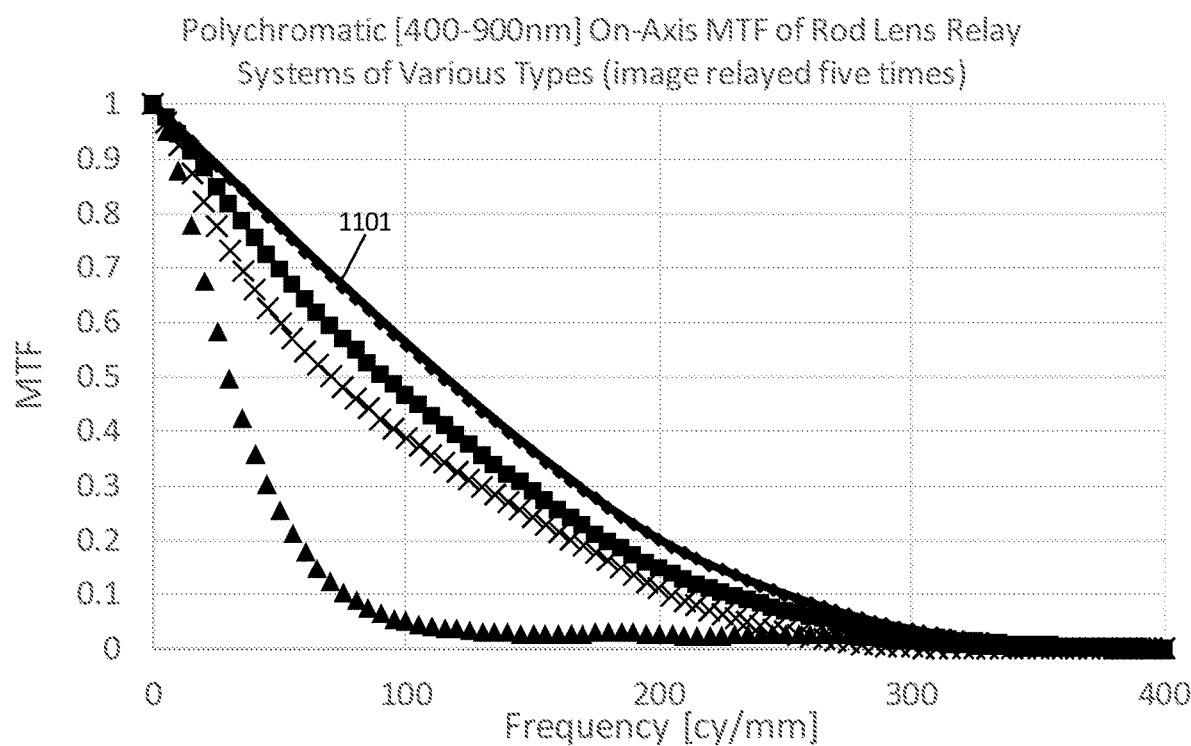
FIG. 11 shows MFT curves for various relay systems, comparing the capabilities of the present invention versus prior art relay systems.

Another metric by which the advantages of the present invention over the prior art can be exhibited are shown in the on-axis MTF (Modular Transfer Function) curves shown in FIG. 11 for a theoretical relay system wherein the image is relayed a total of five times, that is 5 pairs of relay lenses are used. The MFT of the optical system is shown vs. the Frequency in cy/mm. Again, the diamond shaped markers represent the present invention, triangular markers represent data from a conventional achromatic optical system, X shaped markers correspond to U.S. patent application Ser. No. 17/129,391 by Duckett, and square shaped markers correspond to the system suggested by Tesar in U.S. Pat. No. 8,773,756. The diffraction limit 1101 is shown by a solid line that can be seen to be very close and nearly overlapping, to the point where it is often obscured, to the data produced by the current invention. By contrast, each of the other systems deviate significantly from the diffraction limit in the spatial frequency range between 0 and 400 cy/mm.

Figure 12:
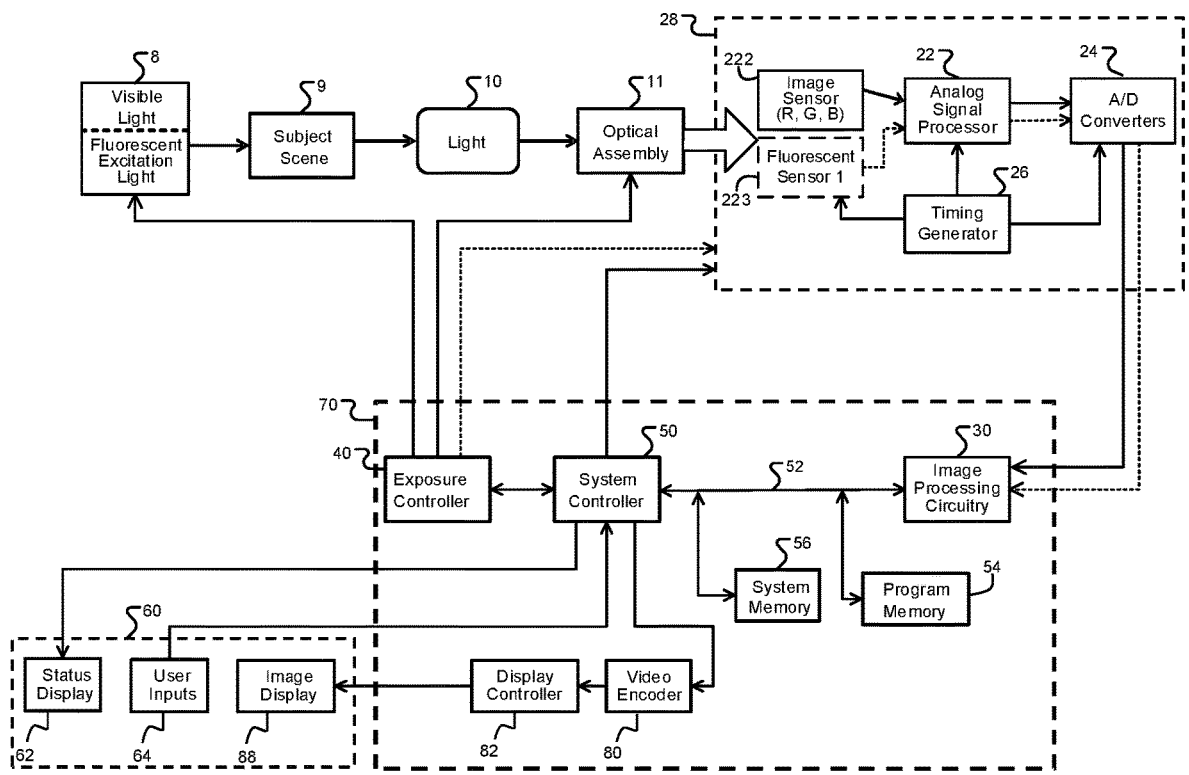
FIG. 12 is a hardware block diagram of system including an example image capture device according to an example embodiment of the invention.

Referring to FIG. 12, a block diagram of system including an image capture device and an endoscope device having an improved correction of chromatic aberration as described above. The invention is applicable to more than one type of device enabled for image capture, such as FI-capable endoscopes, other FI medical imaging devices. The preferred version is an imaging scope system, such as an endoscope.

As shown in the diagram of an endoscope device system, a light source 8 illuminates subject scene 9 with visible light and/or fluorescent excitation light, which may be outside the visible spectrum in the ultra-violet range or the infra-red/near infrared range, or both. Light source 8 may include a single light emitting element configured to provide light throughout the desired spectrum, or a visible light emitting element and a one or more fluorescent excitation light emitting elements. Further, light source 8 may include fiber optics passing through the body of the scope, or other light emitting arrangements such as LEDs or laser diodes positioned at or near the front of the scope.

As shown in the drawing, light 10 reflected from (or, alternatively, as in the case of fluorescence, excitation light 8 absorbed and subsequently emitted by) the subject scene is input to an optical assembly 11, where the light is focused to form an image at a solid-state image sensor(s) 222 and/or fluoresced light sensor(s) 223.

Optical assembly 11 includes an optical relay system constructed according to the techniques provided herein. For example, the embodiments of FIG. 3 or FIG. 7 may be used, or other embodiments. An additional lens group may be included at the camera head, as discussed with respect to FIG. 2. As discussed above, portions of the optical assembly may be embodied in a camera head or other first optical device, while other portions are in an endoscope or other scope device, or the optical assembly 11 may be contained in a single imaging device. Image sensor 222 (which may include separate R, G, and B sensor arrays) and fluoresced light sensor 223 convert the incident visible and invisible light to an electrical signal by integrating charge for each picture element (pixel). It is noted that fluoresced light sensor 223 is shown as an optional dotted box because embodiments may use the RGB image sensor 222 to detect only white light images or to also detect fluoresced light (e.g., NIR, ICG, FI). The latter scheme may be used when the fluoresced light is in a spectrum detectable by image sensor 222 that is in or near the visible light spectrum typically detected by a RGB sensor arrays.

Of course, alternate implementations of the present inventive relay lens systems are possible. For example, optical assembly 11 may include a dichroic beam splitting element and may direct one band of the spectra to one sensor for visual imaging and another band to another sensor for fluorescence imaging. As the present invention enables a scope side solution to the problems associated with chromatic aberration in relay systems, the camera head image sensor assembly 28 need not be adjusted to assure both visible and FI images are in focus.

The image sensor 222 and fluoresced light sensor 223 may be active pixel complementary metal oxide semiconductor sensor (CMOS APS) or a charge-coupled device (CCD).

The total amount of light 10 reaching the image sensor 222 and/or fluoresced light sensor 223 is regulated by the light source 8 intensity, the optical assembly 11 aperture, and the time for which the image sensor 222 and fluoresced light sensor 223 integrates charge. An exposure controller 40 responds to the amount of light available in the scene given the intensity and spatial distribution of digitized signals corresponding to the intensity and spatial distribution of the light focused on image sensor 222 and fluoresced light sensor 223.

Exposure controller 40 also controls the emission of fluorescent excitation light from light source 8 and may control the visible and fluorescent light emitting elements to be on at the same time, or to alternate to allow fluoresced light frames to be captured in the absence of visible light if such is required by the fluorescent imaging scheme employed. Exposure controller 40 may also control the optical assembly 11 aperture, and indirectly, the time for which the image sensor 222 and fluoresced light sensor 223 integrate charge. The control connection from exposure controller 40 to timing generator 26 is shown as a dotted line because the control is typically indirect.

Typically, exposure controller 40 has a different timing and exposure scheme for each of sensors 222 and 223. Due to the different types of sensed data, the exposure controller 40 may control the integration time of the sensors 222 and 223 by integrating sensor 222 up to the maximum allowed within a fixed 60 Hz or 50 Hz frame rate (standard frame rates for USA versus European video, respectively), while the fluoresced light sensor 223 may be controlled to vary its integration time from a small fraction of sensor 222 frame time to many multiples of sensor 222 frame time. The frame rate of sensor 222 will typically govern the synchronization process such that images frames based on sensor 223 are repeated or interpolated to synchronize in time with the 50 or 60 fps rate of sensor 222.

Analog signals from the image sensor 222 and fluoresced light sensor 223 are processed by analog signal processor 22 and applied to analog-to-digital (A/D) converter 24 for digitizing the analog sensor signals. The digitized signals each representing streams of images or image representations based on the data, are fed to image processor 30 as image signal 27, and first fluorescent light signal 29. For versions in which the image sensor 222 also functions to detect the fluoresced light, fluoresced light data is included in the image signal 27, typically in one or more of the three color channels.

Image processing circuitry 30 includes circuitry performing digital image processing functions to process and filter the received images as is known in the art. Image processing circuitry may include separate, parallel pipelines for processing the visible light image data and the FI image data separately. Such circuitry is known in the art and will not be further described here.

Image processing circuitry 30 may provide algorithms, known in the art, for combining visible light imagery with FI imagery in a combined image display, and further highlighting or emphasizing the FI imagery for easily distinguishing the presence of fluorescing features in the image.

Timing generator 26 produces various clocking signals to select rows and pixels and synchronizes the operation of image sensor 222 and fluorescent sensor 223, analog signal processor 22, and A/D converter 24. Image sensor assembly 28 includes the image sensor 222 and fluorescent sensor 223, adjustment control 20, the analog signal processor 22, the A/D converter 24, and the timing generator 26. The functional elements of the image sensor assembly 28 can be fabricated as a single integrated circuit as is commonly done with CMOS image sensors or they can be separately-fabricated integrated circuits.

The system controller 50 controls the overall operation of the image capture device based on a software program stored in program memory 54. This memory can also be used to store user setting selections and other data to be preserved when the camera is turned off.

System controller 50 controls the sequence of data capture by directing exposure controller 40 to set the light source 8 intensity, the optical assembly 11 aperture, and controlling various filters in optical assembly 11 and timing that may be necessary to obtain image streams based on the visible light and fluoresced light. In some versions, optical assembly 11 includes an optical filter configured to attenuate excitation light and transmit the fluoresced light. A data bus 52 includes a pathway for address, data, and control signals.

Processed image data are continuously sent to video encoder 80 to produce a video signal. This signal is processed by display controller 82 and presented on image display 88. This display is typically a liquid crystal display backlit with light-emitting diodes (LED LCD), although other types of displays are used as well. The processed image data can also be stored in system memory 56 or other internal or external memory device.

The user interface 60, including all or any combination of image display 88, user inputs 64, and status display 62, is controlled by a combination of software programs executed on system controller 50. User inputs typically include some combination of typing keyboards, computer pointing devices, buttons, rocker switches, joysticks, rotary dials, or touch screens. The system controller 50 manages the graphical user interface (GUI) presented on one or more of the displays (e.g., on image display 88). In particular, the system controller 50 will typically have a mode toggle user input (typically through a button on the endoscope or camera head itself, but possibly through a GUI interface), and in response transmit commands to adjust image processing circuitry 30 based on predetermined setting stored in system memory. Preferably a system employed with any of the device designs herein provides ability to toggle between at least two modes, visible light and FI modes, and more preferably a combined mode is included in which FI images are combined or overlaid with visible images in a suitable manner known in the art. Such settings may include different settings for different models of scopes that may be attached to a camera head or other imaging device containing image sensor assembly 28.

Image processing circuitry 30 is one of three programmable logic devices, processors, or controllers in this embodiment, in addition to a system controller 50 and the exposure controller 40. Image processing circuitry 30, controller 50, exposure controller 40, system and program memories 56 and 54, video encoder 80 and display controller 82 may be housed within camera control unit (CCU) 70.

CCU 70 may be responsible for powering and controlling light source 8, image sensor assembly 28, and/or optical assembly 11. In some versions, a separate front end camera module may perform some of the image processing functions of image processing circuitry 30.

Although this distribution of imaging device functional control among multiple programmable logic devices, processors, and controllers is typical, these programmable logic devices, processors, or controllers can be combinable in various ways without affecting the functional operation of the imaging device and the application of the invention. These programmable logic devices, processors, or controllers can comprise one or more programmable logic devices, digital signal processor devices, microcontrollers, or other digital logic circuits. Although a combination of such programmable logic devices, processors, or controllers has been described, it should be apparent that one programmable logic device, digital signal processor, microcontroller, or other digital logic circuit can be designated to perform all of the needed functions. All of these variations can perform the same function and fall within the scope of this invention.

As used herein the terms "comprising," "including," "carrying," "having" "containing," "involving," and the like are to be understood to be open-ended, that is, to mean including but not limited to. Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

Although the invention and its advantages have been described in detail, it should be understood that various changes, substitutions and alterations can be made herein without departing from the scope of the invention as defined by the appended claims. The combinations of features described herein should not be interpreted to be limiting, and the features herein may be used in any working combination or sub-combination according to the invention. This description should therefore be interpreted as providing written support, under U.S. patent law and any relevant foreign patent laws, for any working combination or some sub-combination of the features herein.

Moreover, the scope of the present application is not intended to be limited to the particular embodiments of the process, machine, manufacture, composition of matter, means, methods and steps described in the specification. As one of ordinary skill in the art will readily appreciate from the disclosure of the invention, processes, machines, manufacture, compositions of matter, means, methods, or steps, presently existing or later to be developed that perform substantially the same function or achieve substantially the same result as the corresponding embodiments described herein may be utilized according to the invention. Accordingly, the appended claims are intended to include within their scope such processes, machines, manufacture, compositions of matter, means, methods, or steps.

The invention claimed is:

1. A relay system for an endoscope comprising:
an opposing pair of rod lens assemblies positioned symmetrically with respect to a central airspace, wherein each rod lens assembly includes optical elements consisting essentially of:
  a meniscus lens positioned immediately adjacent to a central airspace and with the convex surface facing the airspace and an inner concave face opposite thereto;
  a first lens having positive optical power with a convex face positioned adjacent to the inner face of the meniscus lens, and a second face;
  a rod lens, adjacent to the first lens having positive optical power, having a first face adjacent to the second face of the first lens, and a second face, both first and second faces of the rod lens being beam passing surfaces; and
  a second lens having a positive optical power with an inner face adjacent to the second face of the rod lens, and an outer convex face,
  wherein the meniscus lens, the first lens having positive optical power, the rod lens, and the second lens having positive optical power together provide chromatic aberration correction by manipulating light across a continuous spectrum from a minimum wavelength of at least 400 nm through a maximum wavelength of at least 700 nm to come to a common focus in a common image plane, and wherein spherical aberration is corrected across the continuous spectrum.

2. The relay system of claim 1, wherein the continuous spectrum ranges from 400-900 nm.

3. The relay system of claim 1, wherein the second beam passing face of the rod lens is planar, and the second lens having a positive power is a plano-convex lens, where its inner face is planar and is adjacent to the second, planar face of the rod lens.

4. The relay system of claim 3, wherein the rod lens has two planar, beam passing faces, and the first lens having a positive power is a plano-convex lens, with its second, planar face adjacent to the first planar face of the rod lens.

5. The relay system of claim 1, wherein the first lens having positive power is a bi-convex lens.

6. The relay system of claim 1, wherein the first lens having positive power is comprised of materials selected from the group consisting of fluorine glass, phosphate glass, and fluorophosphate glass; and wherein the first lens having a positive power has an index of refraction between 1.43 and 1.55 at a wavelength of 587 nm.

7. The relay system of claim 1, wherein all elements of each rod lens assembly are cemented together.

8. The relay system of claim 1, wherein the second lens having a positive optical power has a higher refractive index and a lower Abbe number than does the rod lens.

9. The relay system of claim 1, wherein each rod lens assembly has a working f-number than is less than six.

10. The relay system of claim 1, wherein the central airspace between the rod lens assemblies further comprises an aperture stop.

11. An endoscope comprising:
a shaft with a distal end and a proximal end;
an objective lens positioned within the shaft and configured to gather light from an object scene;

a relay system to relay the gathered light from the distal end to the proximal end of the shaft, the relay system comprising:
   an opposing pair of corrective rod lens assemblies positioned symmetrically with respect to a central airspace, wherein each corrective rod lens assembly includes optical elements consisting essentially of:
      a meniscus lens positioned immediately adjacent to a central airspace and with the convex surface facing the airspace and an inner concave face opposite thereto;
      a first lens having positive optical power with a convex face positioned adjacent to the inner face of the meniscus lens, and a second face;
      a rod lens, adjacent to the first lens having positive optical power, having a first face adjacent to the second face of the first lens, and a second face, both first and second faces of the rod lens being beam passing surfaces; and
      a second lens having a positive optical power with an inner face adjacent to the second, face of the rod lens, and an outer convex face,
   wherein the meniscus lens, the first lens having positive optical power, the rod lens, and the second lens having positive optical power together provide chromatic aberration correction by manipulating light across a continuous spectrum from a minimum wavelength of at least 400 nm through a maximum wavelength of at least 700 nm to come to a common focus in a common image plane, and wherein spherical aberration is corrected across the continuous spectrum;
   a proximal lens group to focus the light relayed by the relay system onto the common image plane.

12. The endoscope of claim 11, wherein the relay system comprises at least five opposing pairs of rod lens assemblies, and at least one of the five rod lens assemblies is the corrective rod lens assembly.

13. The endoscope of claim 12, wherein each of the five or more rod lens assemblies is a corrective rod lens assembly.

14. The endoscope of claim 11, further comprising an image sensor placed at the common image plane to capture an image of the focused, relayed light.

15. The endoscope of claim 11, wherein the f-number of the rod lens assemblies is less than six.

16. The endoscope of claim 11, wherein the first lens having positive power is comprised of materials selected from the group consisting of fluorine glass, phosphate glass, and fluorophosphate glass; and wherein the first lens having a positive power has an index of refraction between 1.43 and 1.55 at a wavelength of 587 nm.

17. The endoscope of claim 11, wherein the continuous spectrum ranges from 400-900 nm.

* * * * *